UNITED STATES PATENT OFFICE.

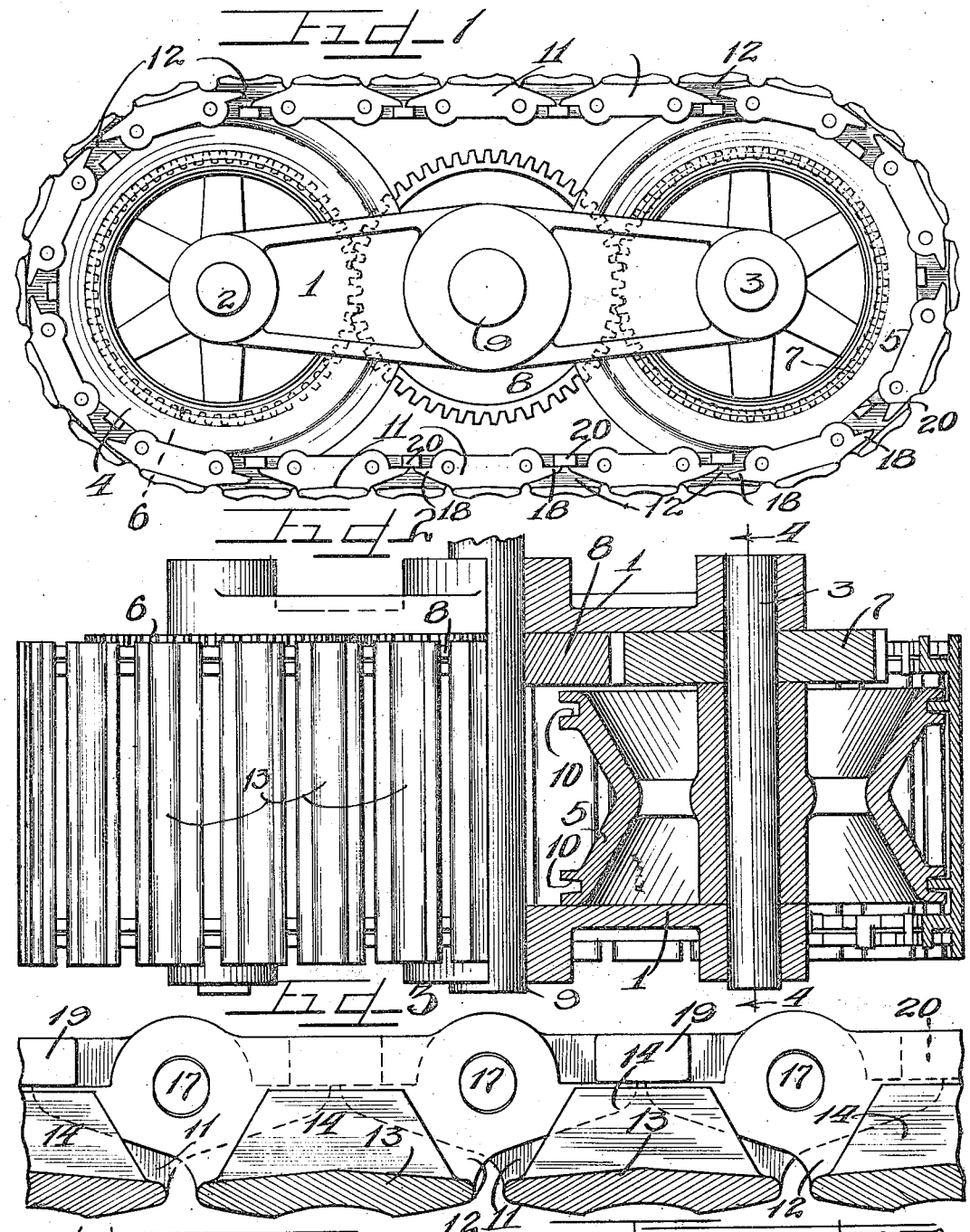

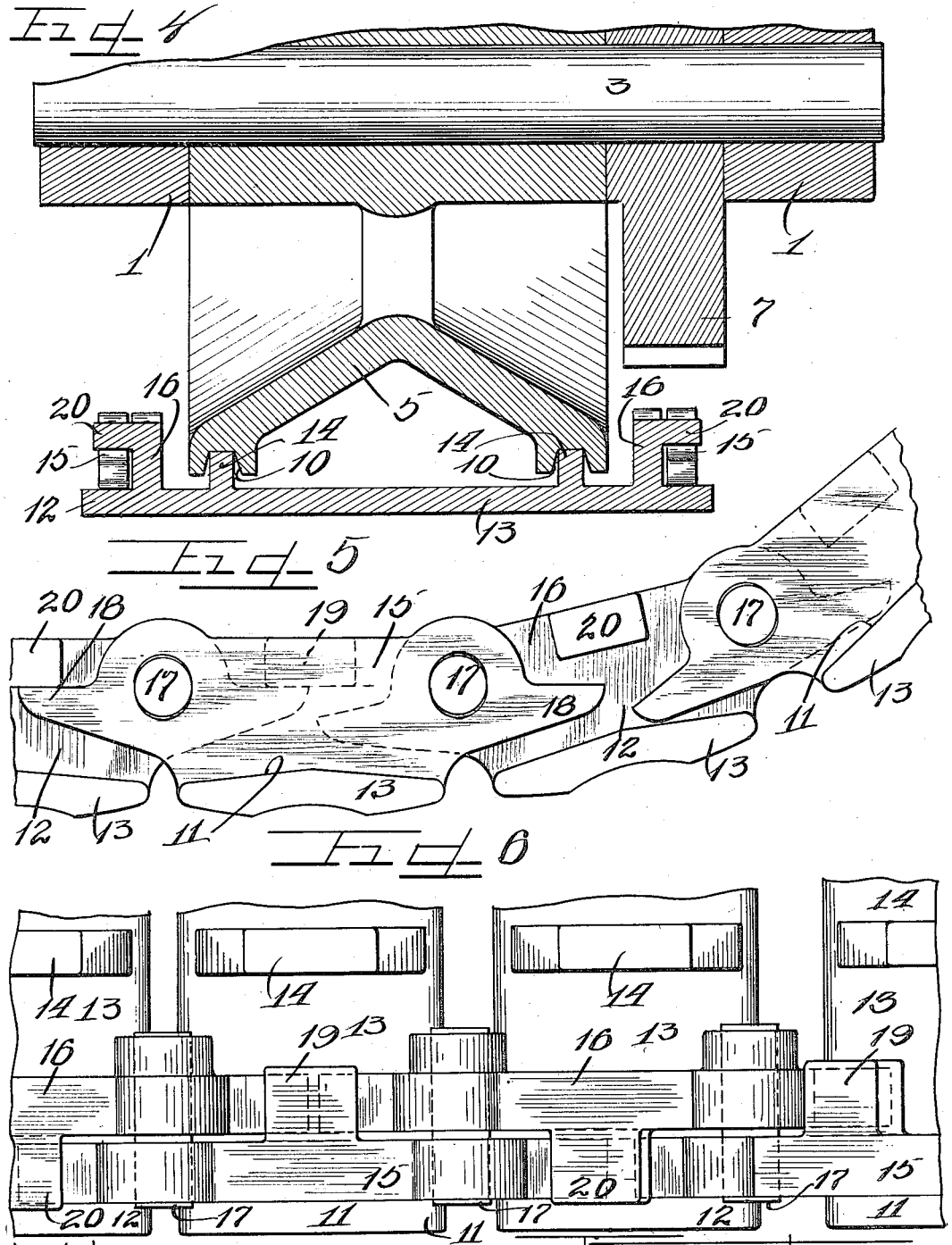

LAWRENCE G. ZESBAUGH, OF MINNEAPOLIS, MINNESOTA.

CHAIN TRACTOR-TREAD.

1,261,989.  Specification of Letters Patent.  Patented Apr. 9, 1918.

Application filed January 11, 1917. Serial No. 141,828.

*To all whom it may concern:*

Be it known that I, LAWRENCE G. ZESBAUGH, a citizen of the United States, and a resident of the city of Minneapolis, in the county of Hennepin and State of Minnesota, have invented certain new and useful Improvements in Chain Tractor-Treads, and I do hereby declare that the following is a full, clear, and exact description of the same, reference being had to the accompanying drawings, and to the numerals of reference marked thereon, which form a part of this specification.

This invention relates to an improved form of tractor chain construction some times referred to a caterpillar drive, wherein the tread member is composed of a series of connected links, which engage around and are driven by power driven wheels, affording a long broad traction surface for contact with the ground.

It is an object of this invention to provide a tractor tread construction embracing a plurality of linked members interconnected to form a continuous flexible tread trained about driving wheels and with the link members constructed to permit flexing thereof with respect to one another in only one direction.

It is also an object of this invention to construct a chain traction tread embodying a number of connected linked traction members, each provided with co-acting lugs and projections to limit the flexing movement of the chain to only one direction.

It is furthermore an important object of this invention to construct a chain traction tread comprising link members pivotally connected to one another, and each provided with projecting means disposed longitudinally of the chain to co-act with transversely arranged lugs formed on the respective link members to limit the flexure of the traction chain to one direction, yet readily permitting the same to track around the periphery of driving sprocket wheels, provided with recesses to receive teeth or lugs engaged therein which are formed on the respective members of the traction tread members.

It is finally an object of this invention to construct an improved form of chain traction tread embracing a plurality of members connected to one another in a novel and improved manner, and operating as a whole in a thoroughly practical and efficient manner to perform the purpose for which designed.

The invention (in a preferred form) is illustrated in the drawings and hereinafter more fully described.

On the drawings:

Figure 1 is a side elevation of a chain traction tread embodying the principles of my invention, shown connected around a power driven driving wheel.

Fig. 2 is a top plan view thereof with one half of the sector shown in section.

Fig. 3 is a fragmentary longitudinal vertical section taken through the bottom run of the tractor chain shown in Fig. 1.

Fig. 4 is a fragmentary detail section taken on line 4—4 of Fig. 2.

Fig. 5 is an enlarged fragmentary side elevation of a portion of a chain tractor tread, showing the possible direction of flexure.

Fig. 6 is a fragmentary top plan view of the portion of the chain tractor tread shown in Fig. 5.

As shown on the drawings:

Referring to Fig. 1, the reference numeral 1, indicates an axle frame member in the opposite ends of which are journaled axles 2 and 3, respectively, and secured upon said axles are tractor wheels 4 and 5, respectively, each having a gear secured thereto, one denoted by the reference numeral 6, and the other by the reference numeral 7, and both are driven by an intermediate power driven gear 8, journaled upon an axle 9, which is supported centrally in the axle frame members 1.

Each of said respective driving tractor wheels 4 and 5, has a periphery of double conical shape, as shown in Fig. 2, and is provided with sprocket recesses 10, at each end thereof for co-action with sprocket lugs or teeth on the chains hereinafter described. The link or chain traction tread consists of a series of members pivoted or linked to one another of which alternate members are identical in construction. Those which may be termed the outside members of the chain tread construction are denoted as a whole by the reference numeral 11, and the inside members linked to and arranged therebetween are denoted as a whole by the reference numerals 12. Each of said linked chain members comprises a long tread portion slightly grooved on its outer surface for contact with the ground, denoted by the reference numeral 13, and formed on the inner surface of each of said tread portions 13, are sprocket teeth 14, adapted for engagement with the recesses 10, in the respective traction wheels 4 and 5.

Each of the respective chain tread members 11 and 12, has formed on its inner surface at each end thereof an upstanding pivot bearing and wall member, those on the tread members 11, disposed closely adjacent the outer end thereof, and denoted by the reference numeral 15, and those on the tread members 12, spaced slightly inwardly from the ends thereof so as to be staggered with respect to the members 15, and denoted by the reference numeral 16. Each of said respective bearing members 15 and 16, is apertured near each of its ends to receive pintle bolts 17, whereby the respective members 15 and 16, of adjacent tread members are pivotally connected to one another, and it is to be noted by reference to Figs 3 and 5, that the apertures in said respective bearing end wall members 15 and 16, are slightly elongated to permit shifting of the pintle bolts for a purpose hereinafter described.

The outer ends of each of the respective end wall bearing members 15 and 16, terminate in extended lugs or projections 18, and formed on each of said end wall bearing members are lugs 19 and 20, respectively, the lugs 19, formed on the members 15, projecting inwardly therefrom, and the lugs 20, formed on the members 16, projecting outwardly therefrom, said respective lugs affording stops for the extended projections 18, thus limiting the flexure of the chain tread to movement in only one direction.

The operation is as follows:

The chain tread is engaged about the driving traction wheels 4 and 5, in a usual and well known manner, and as said wheels are both positively driven through the respective gears 6 and 7, meshing with the common intermediate gear 8, the chain tread is caused to travel therearound and the lower run thereof in contact with the ground, serves to support and propel the vehicle upon which the wheels 4 and 5, are mounted. The teeth 14, formed on each of the respective link tread members, mesh with the sprocket recesses 10, in the respective traction wheels 4 and 5, so that the link tread is driven by said traction wheels. Owing to the pivotal pintle connection between the respective link tread members, the same readily track around the periphery of the respective driving wheels, but flexure thereof in an opposite direction is prevented owing to engagement of the projections 18, beneath the respective stops 19 and 20. Furthermore, owing to the staggered interfitting relation between the respective end wall pivot members 15 and 16, of the tread elements, a side or lateral movement of the members is prevented, although clearance is allowed for movement of the hinge and a slight lateral flexure of the chain which is provided as an evener to overcome undue strains under working conditions. Due to the slight play afforded the respective pintles 17, in the elongated pintle apertures therefor, said tread elements readily interlock with one another to prevent inward flexure thereof without thereby stressing the pivot pintles. As shown in this form, the pintle pins 17, and wall pivot members 15 and 16, are utilized to connect the tread members and transmit driving power. However, I may choose to vary this construction by fastening the tread members 11 and 12, to any well known form of chain or belting.

In the form of tread shown, the lugs and interlocking members 18, come in working contact on one horizontal plane with the stresses resulting vertically. It will be noted that in this form said stresses will in no way be affected or varied by the power transmission forces. Furthermore, this provides for elongation of the chain, resulting from worn connections, without affecting the horizontal working position of the treads and also permits the treads to float on a horizontal plane allowing for irregularities encountered in operation.

I am aware that various details of construction may be varied through a wide range without departing from the principles of this invention, and I therefore do not purpose limiting the patent granted otherwise than necessitated by the prior art.

I claim as my invention:

1. A chain traction tread comprising a plurality of members linked to one another, inwardly directed lugs on alternate members, outwardly directed lugs on the members intermediate said alternate members, and projections formed on each of said members co-acting with said lugs to limit the flexure of the chain tread to only one direction of movement.

2. In a traction tread of the class described a plurality of members linked to one another, integral end bearing walls formed on each end of each thereof, disposed whereby said pivot end walls of adjacent members are staggered with respect to one another, a pivot affording a connection between said end walls of the respective members, and co-acting projections and lugs formed on said respective pivot end walls of said members to limit the flexure of the traction tread to only one direction.

3. A one-way bending traction tread comprising a plurality of members linked to one another, lugs adapted to carry said members and projections on each member adapted to engage upwardly against the lugs and support adjoining members by a lifting action upwardly through the lugs and limiting the flexure of the tread to one direction of movement.

4. A chain traction tread comprising a plurality of members, pivot bearing members for each of said members having elongated apertures, pintle bolts engaging in the elongated apertures linking the members to one another, bearing seats formed on each of said members and longitudinally directed projections formed on each of said members co-acting with said bearing seats to limit the flexure of the chain tread as to one direction of movement whereby in their flexure limiting position said bearing seats and projections are engaged without locking or controlling the position of individual members as to a slight movement on a horizontal plane.

5. A chain traction tread comprised of a plurality of members linked to one another, inwardly directed lugs on alternate members, outwardly directed lugs on members intermediate said alternate members and projections formed on each of said members adapted to engage the lugs of said members thereon, limiting the flexure of the chain tread as to one direction of movement.

6. A chain traction tread comprising a plurality of members, means linking the same to one another permitting a relative shifting of the members, bearing seats formed on each of said members, longitudinally directed projections formed on each of said members co-acting with said bearing seats to limit the flexure of the chain tread as to one direction of movement whereby in their flexure limiting position said bearing seats and projections are engaged along one general plane of contact with resulting pressures in one general direction perpendicular to said plane.

In testimony whereof I have hereunto subscribed my name in the presence of two subscribing witnesses.

LAWRENCE G. ZESBAUGH.

Witnesses:
   G. HASLEHURST,
   V. M. TRUCKER.